US010973359B2

(12) United States Patent
Donarski et al.

(10) Patent No.: US 10,973,359 B2
(45) Date of Patent: *Apr. 13, 2021

(54) STEAM GENERATION SYSTEM FOR USE IN COOKING APPLIANCE

(71) Applicant: WHIRLPOOL CORPORATION, Benton Harbor, MI (US)

(72) Inventors: Robert S. Donarski, St. Joseph, MI (US); Nicholas E. Crow, St. Joseph, MI (US); Jason Schneemann, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 201 days.

This patent is subject to a terminal disclaimer.

(21) Appl. No.: 16/232,485

(22) Filed: Dec. 26, 2018

(65) Prior Publication Data

US 2019/0125121 A1 May 2, 2019

Related U.S. Application Data

(63) Continuation of application No. 15/715,307, filed on Sep. 26, 2017, now Pat. No. 10,206,532, and a (Continued)

(51) Int. Cl.
*A47J 27/04* (2006.01)
*F24C 15/32* (2006.01)
(Continued)

(52) U.S. Cl.
CPC ............... *A47J 27/04* (2013.01); *F22B 1/282* (2013.01); *F22B 37/26* (2013.01); *F24C 15/327* (2013.01); *A47J 2027/043* (2013.01)

(58) Field of Classification Search
CPC .. A47J 27/04; A47J 2027/043; A47J 2027/04; A47J 2027/05; F22B 1/282;
(Continued)

(56) References Cited

U.S. PATENT DOCUMENTS 3,394,665 A 7/1968 Williams
3,732,396 A 5/1973 Tucker
(Continued)

FOREIGN PATENT DOCUMENTS

DE 10109251 C1 8/2002
DE 102009055144 A1 6/2011
(Continued)

*Primary Examiner* — Shawntina T Fuqua
(74) *Attorney, Agent, or Firm* — Price Heneveld LLP

(57) ABSTRACT

A steam generator system for a cooking appliance includes an in-line heating element coupled to a heating tube, wherein water from a water reservoir is gravitationally fed into the heating tube for heating by the in-line heating element to produce a hot water and steam mixture. A first supply line is coupled to the heating tube to carry the mixture to a separator without the need for moving or complex pump parts. The separator separates steam and hot water from the mixture of the two. A second supply line is coupled to the separator at a first end and opens into the cooking cavity of the cooking appliance at a second end. The second supply line is configured to supply steam separated at the separator to the cooking cavity via a steam outlet disposed in the cooking cavity.

20 Claims, 6 Drawing Sheets

Related U.S. Application Data continuation of application No. 14/753,219, filed on Jun. 29, 2015, now Pat. No. 9,788,679.

(51) Int. Cl.
*F22B 1/28* (2006.01)
*F22B 37/26* (2006.01)

(58) Field of Classification Search
CPC .......... F22B 1/284; F22B 1/285; F22B 1/288; F22B 1/28; F22B 37/26; F22B 37/263; F22B 37/266; F24C 15/327
See application file for complete search history.

(56) References Cited

U.S. PATENT DOCUMENTS

| | | |
|---|---|---|
| 3,814,901 A | 6/1974 | Morhack |
| 4,913,039 A | 4/1990 | Sutphen |
| 4,991,545 A | 2/1991 | Rabe et al. |
| 5,178,125 A | 1/1993 | Kuen |
| 5,355,840 A | 10/1994 | Violi |
| 5,530,223 A | 6/1996 | Culzoni et al. |
| 6,318,246 B2 | 11/2001 | Fukushima et al. |
| 6,666,086 B2 | 12/2003 | Colman et al. |
| 6,833,032 B1 | 12/2004 | Douglas et al. |
| 7,091,454 B2 | 8/2006 | Cho et al. |
| 7,113,695 B2 | 9/2006 | Ono |
| 7,199,340 B2 | 4/2007 | Yamasaki et al. |
| 7,445,703 B2 | 11/2008 | Savage et al. |
| 7,591,859 B2 | 9/2009 | Wong et al. |
| 7,690,062 B2 | 4/2010 | Pinkowski et al. |
| 7,867,534 B2 | 1/2011 | Sells et al. |
| 8,704,138 B2 | 4/2014 | Sells et al. |
| 10,206,532 B2 * | 2/2019 | Donarski ................ F22B 1/282 |

FOREIGN PATENT DOCUMENTS

| | | |
|---|---|---|
| EP | 1654931 A2 | 5/2006 |
| EP | 2048444 A2 | 4/2009 |

* cited by examiner

STEAM GENERATION SYSTEM FOR USE IN COOKING APPLIANCE

CROSS-REFERENCE TO RELATED APPLICATION

This application is a continuation of U.S. patent application Ser. No. 15/715,307, filed on Sep. 26, 2017 (now U.S. Pat. No. 10,206,532) entitled STEAM GENERATION SYSTEM FOR USE IN A COOKING APPLIANCE, which is a continuation of U.S. patent application Ser. No. 14/753,219, filed on Jun. 29, 2015 (now U.S. Pat. No. 9,788,679), entitled STEAM GENERATION SYSTEM FOR USE IN A COOKING APPLIANCE, the entire disclosure of which is hereby incorporated by reference.

FIELD

The present concept relates to a steam generator system for use in a cooking appliance, and more particularly, to a steam generator system configured to rapidly produce steam that is delivered to a cooking cavity of the cooking appliance under pressure produced in creating the steam.

BACKGROUND

The existing steam generators are typically costly and include a boiler with a submerged heating element. With the heating element submerged in a large amount of water in the boiler, such known devices are slow to create steam when the heating element is energized. Further, such steam generating devices require hard plumbing to a user's cold water supply and several other components, such as solenoids, sensors, pumps and water valves to move water and steam through the system. Thus, a system is desired that is a low cost simple steam generator device for use in a cooking appliance that does not require hard plumbing to a user's water supply, has few moving parts, and that can be modified for use in multiple configurations of various cooking appliances.

SUMMARY

One aspect of the present concept includes a steam generator system for a cooking appliance having a cooking cavity. The steam generator system includes a water reservoir configured to store water for use in the system. An in-line heating element is coupled to a heating tube and water from the water reservoir is gravitationally fed into the heating tube for heating by the in-line heating element to produce a hot water and steam mixture. A first supply line is coupled to the heating tube at a first end and further coupled to a separator at a second end. The hot water and steam mixture is moved under pressure up the first supply line from the first end thereof towards the separator disposed at the second end thereof. The separator is configured to separate steam and hot water from the steam and hot water mixture. A second supply line is coupled to the separator at a first end and opens into the cooking cavity of the cooking appliance at a second end. The second supply line is configured to supply steam separated at the separator to the cooking cavity via a steam outlet disposed in the cooking cavity. A return line is coupled to the separator at a first end and further coupled to the heating tube at a second end, wherein the return line is configured to gravitationally deliver hot water separated by the separator to the heating tube at a location on the heating tube that is downstream from the in-line heating element coupled to the heating tube.

Another aspect of the present concept includes a steam generator system for a cooking appliance, wherein the steam generator system includes a water reservoir at least partially disposed in a lower portion of the steam generator system. An in-line heating element is coupled to a heating tube, wherein the steam generator system is configured such that water from the water reservoir is gravitationally fed to the heating tube for subsequent heating by the in-line heating element to produce a hot water and steam mixture. A first supply line is coupled to the heating tube at a first end and further coupled to a separator at a second end, wherein the separator is disposed in an upper portion of the steam generator system. The temperature and weight of the hot water and steam mixture defines a first bubble pump used to move the hot water and steam mixture from the lower portion of the steam generator system to the separator disposed in the upper portion of the steam generator system. A second supply line is coupled to the separator at a first end and includes a steam outlet opening into a cooking cavity of the cooking appliance at a second end. The second supply line is configured to supply steam separated at the separator to the cooking cavity. A return line is coupled to the separator at a first end and further coupled to the heating tube at a second end, wherein the return line is configured to gravitationally deliver hot water separated by the separator to the heating tube.

Yet another aspect of the present concept includes a method of generating and delivering steam to a cooking cavity of a cooking appliance. The method includes the steps of gravitationally delivering water from a water reservoir to a heating tube in a lower portion of a steam generating system; energizing an in-line heating element thermally coupled to the heating tube; heating the water via the in-line heating element; producing a pressurized hot water and steam mixture by heating the water via the in-line heating element; transporting the hot water and steam mixture to a separator disposed in an upper portion of the steam generating system via pressure; separating the hot water and steam mixture into a hot water component and a steam component via the separator; and transporting the steam component to the cooking cavity of the cooking appliance via pressure.

These and other features, advantages, and objects of the present concept will be further understood and appreciated by those skilled in the art by reference to the following specification, claims, and appended drawings.

DETAILED DESCRIPTION

Figure 1:
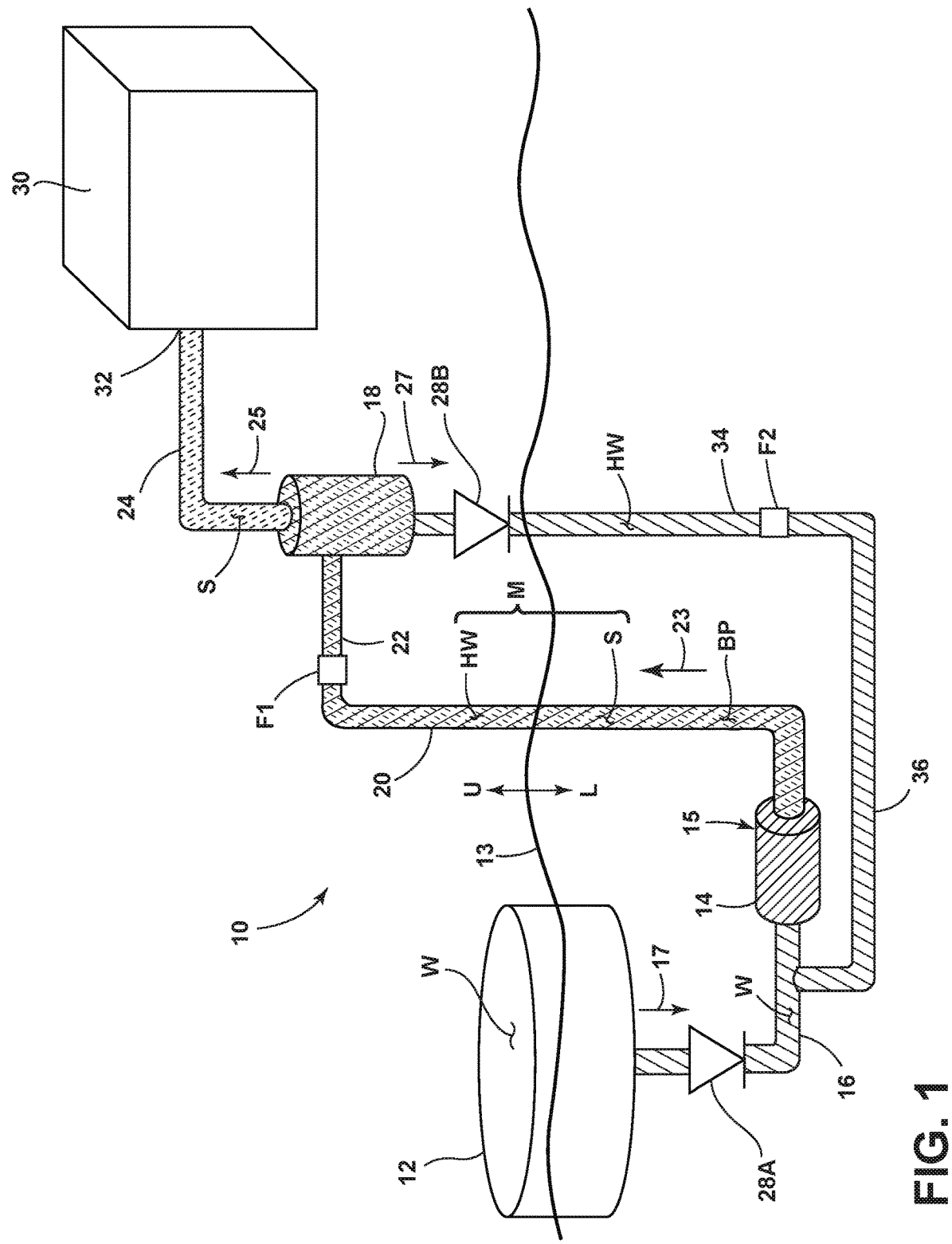
FIG. 1 is schematic representation of a steam generator system for use in a cooking appliance.

For purposes of description herein, the terms "upper," "lower," "right," "left," "rear," "front," "vertical," "horizontal," and derivatives thereof shall relate to the device as oriented in FIG. 1. However, it is to be understood that the device may assume various alternative orientations except for expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Further, the terms "upstream" and "downstream" generally refer to the locations within the steam generator system relative to a reference feature of the steam generating system, as will be understood by one of ordinary skill in the art.

Figure 2:
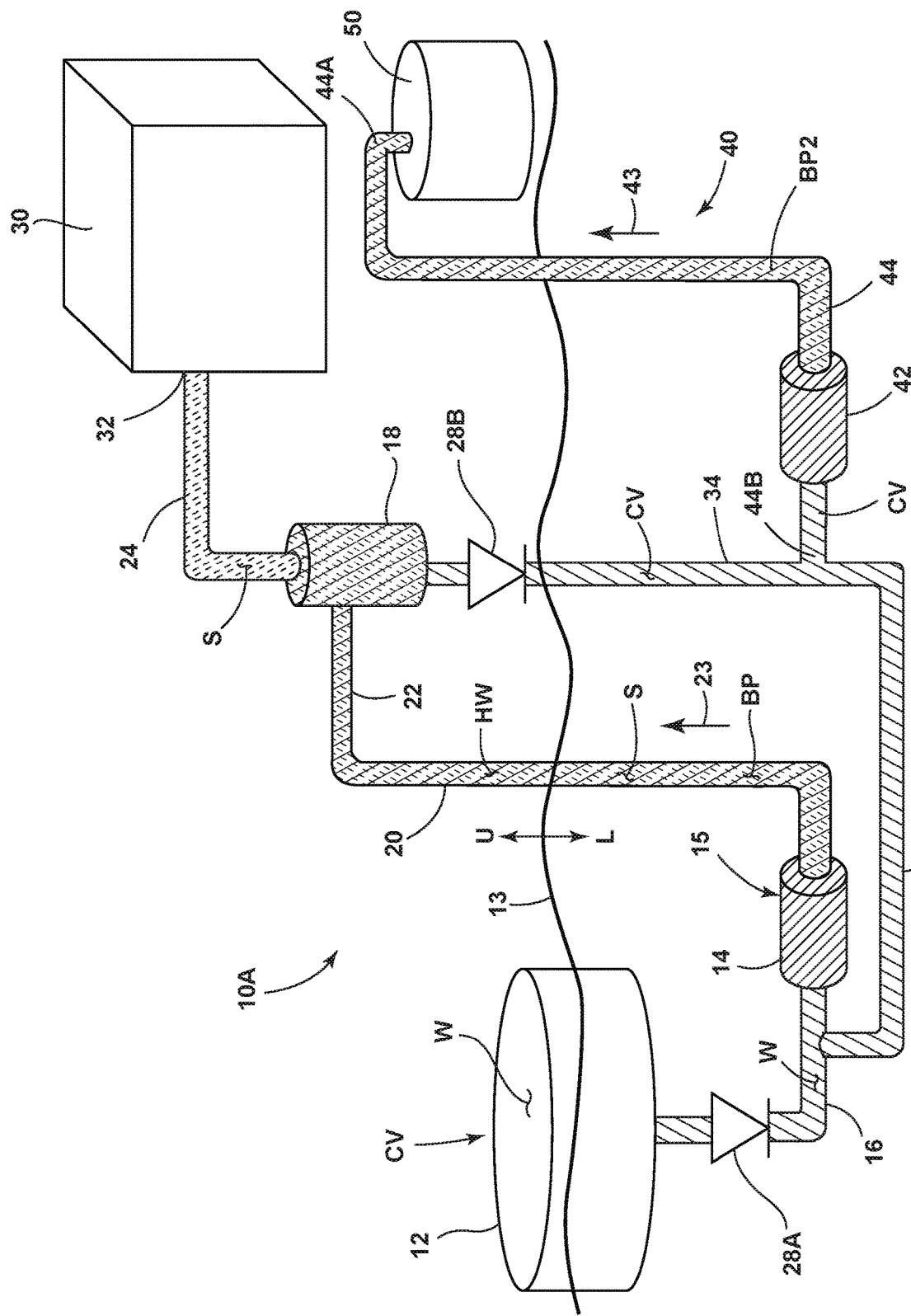
FIG. 2 is a schematic representation of a steam generator system of another embodiment having a descaling loop.
Figure 3:
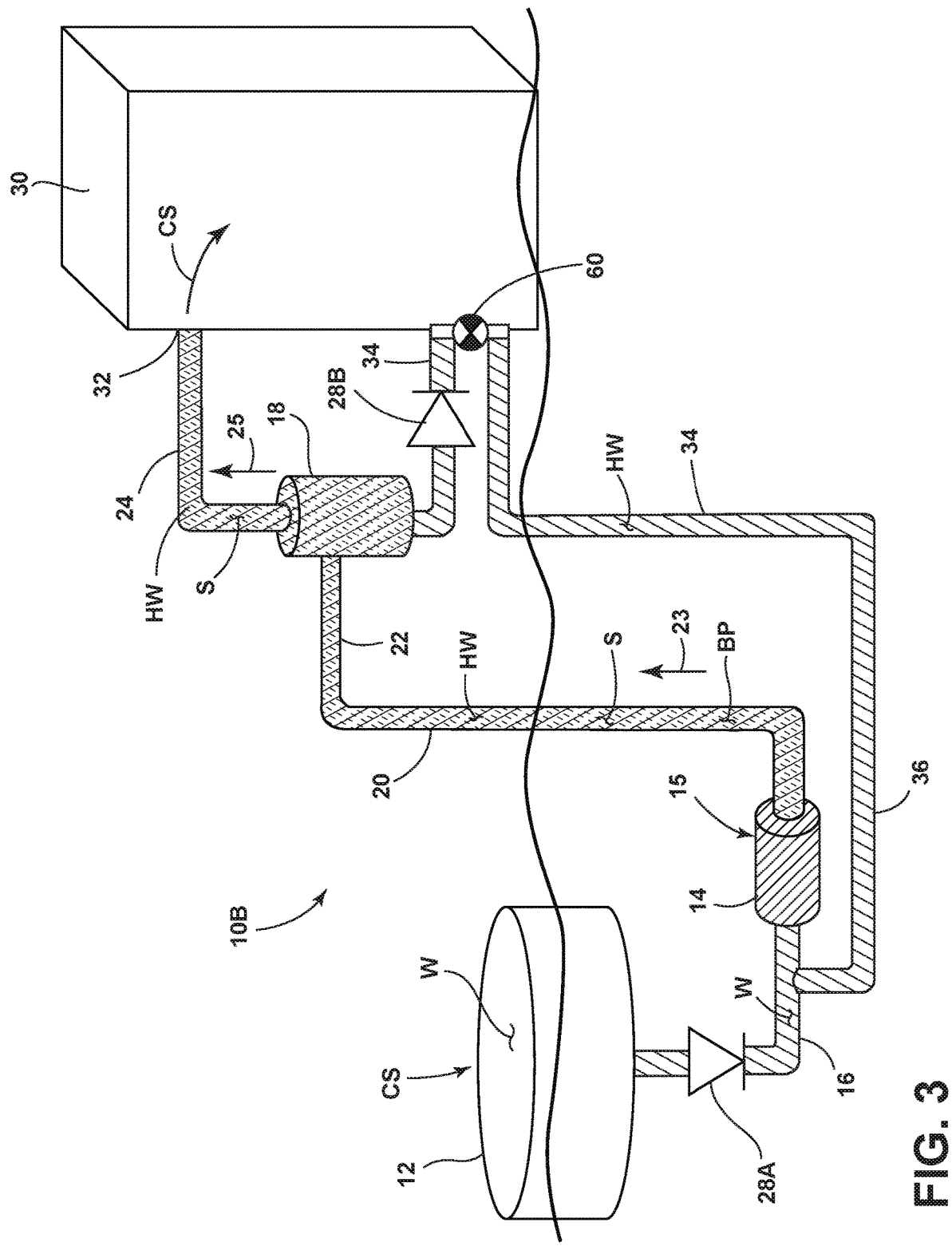
FIG. 3 is a schematic representation of a steam generator system according to another embodiment configured to provide a descaling function.

Referring now to FIG. 1, reference numeral 10 identifies a steam generator system of the present concept. The steam generator system 10 is configured for use in a cooking appliance such as an oven, microwave oven, or other like cooking device. As shown in FIG. 1, the steam generator system 10 includes a number of supply lines connecting a cooking cavity 30 of a cooking appliance to a water reservoir 12 of the cooking appliance. The supply lines shown in the accompanying figures perform a variety of functions and are generally configured to transport either water W, a hot water and steam mixture M, or steam S throughout the system 10 in a cycle. The supply lines shown in FIGS. 1-3 are meant to be exemplary configurations only and may be referred to herein as supply lines, return lines, feed tubes or heating tubes to better indicate specific functions of the different lines. As such, the supply lines depicted in the figures and described below are not meant to limit the steam generating system 10 to any one specific configuration unless otherwise stated. In FIG. 1, a water line of stored water W is indicated by reference numeral 13 and defines a boundary dividing the steam generator system 10 between an upper portion U and a lower portion L. As water W is introduced into and stored in the water reservoir 12, it is contemplated that the lower portion L of the steam generator system 10 will be flooded or filled with water up to the water line 13. The upper portion U of the steam generator system 10 is considered dry until the steam generator system 10 is activated. The water reservoir 12 may be a removable water reservoir that can be removed and filled by the user and subsequently placed in an appliance in which the steam generator system 10 is disposed, to fill the lower portion L thereof with water W. As further shown in FIG. 1, the steam generator system 10 further includes an in-line heating element 14 disposed on a supply line or heating tube 16, which is configured below the water reservoir 12. The in-line heating element 14 may be an electrically powered unit that defines a boiler 15 for the steam generator system 10 as coupled to heating tube 16. In use, water W, steam S, or a mixture M thereof, is moved throughout the system 10 without using any actual moving pumps. Rather, the present concept uses one or more bubble pumps, pressure, and gravity to move water W, steam S, hot water HW or a mixture thereof through the system 10, as further described below. Specifically, water W from the water reservoir 12 is gravitationally fed to the in-line heating element 14 via supply line or heating tube 16 in a direction as indicated by arrow 17. When a duty cycle or steam generating cycle is initiated by a user, the heating element 14, which is thermally coupled to heating tube 16, is energized and thereby heats the water W within the heating tube to generate a mixture M of steam S and hot water HW. The steam S and hot water HW are then carried as a mixture M to a separator 18 through supply lines 20, 22 in a substantially vertical direction 23 via a first bubble pump BP. The first bubble pump BP is created by the in-line heating element 14 heating the water W supplied from the water reservoir 12.

As further shown in FIG. 1, the water W passes through a lower check valve 28A which is a one-way check valve, such as a ball and cone check valve, which allows the water W to pass therethrough in the one-way direction as indicated by arrow 17, while preventing backflow of water back towards the water reservoir 12. As the water W is heated by the in-line heating element 14, water vapor or steam is generated which imparts a force within the system 10, such that the hot water and steam mixture M is forced upward in the direction as indicated by arrow 23 from the lower portion L to the upper portion U of the system 10. The force produced moves the hot water and steam mixture M in the direction as indicated by arrow 23 as this is the only way for the mixture M to travel, given the location of the lower check valve 28A which will not allow the mixture M to enter to water reservoir 12. In this way, the system 10 moves the mixture M from the in-line heating element 14 to the separator 18 by means of a first bubble pump BP which is powered by the heating of the water W, which creates pressure used to move the lighter weight vapor and hot water mixture M to the upper portion U of the system 10. It is contemplated that the initiation of a steam generating cycle may be initiated by a user via a user interface disposed on the cooking appliance in which the steam generator system 10 is integrated. Further the steam generator system 10 of the present concept can be integrated into pre-programmed cooking sequences so that an appropriate amount of steam is delivered to the cooking cavity 30 for a select cooking feature.

The steam generator system 10 of the present concept is a sealed system, such that the steam S generated is under slight pressure. In this way, the steam S travels vertically in a direction as indicated by arrow 23 from the separator 18 up a feed tube 24 which opens into the cooking cavity 30 at a steam outlet 32. Here, the steam S is delivered for using in a cooking procedure. From the separator 18, the hot water HW is fed back into the boiler 15 through return lines 34, 36 where it is reintroduced into heating tube 16 downstream from heating element 14 to be reheated to generate more steam S by the in-line heating element 14 if a duty cycle has not yet completed. Since the only water W being heated in the steam generator system 10 is the water W within the heating tube 16, the reaction time, or time needed to create steam S from the water W, is much faster as compared to a traditional boiler, even if the water W is cold to start. The time necessary to generate steam from the system 10 is contemplated to be less than a minute, or approximately 20-30 seconds. The confined volume of the heating tube 16 provides for a fast water-to-steam generating time as compared to a system that heats an entire volume of water in a reservoir. Thus, as shown in FIG. 1, the steam generator system 10 is capable of producing steam S and delivering this steam S to the cooking cavity 30 without the use of complex pumping mechanisms or other such mechanisms configured to move water through a system. As used in the system 10 of the present concept, the separator 18 provides an interior volume where the hot water and steam mixture M can circulate and separate into its component parts (steam S and hot water HW). The lighter component, the vapor steam component S, will rise in the direction indicated by arrow 23, as the hot water component HW is gravitationally fed to the return lines 34, 36. As further shown in FIG. 1, an upper check valve 28B is shown disposed on return line 34 in the upper portion U of the system 10. Upper check valve 28B is contemplated to be a one-way check valve similar in configuration to the lower check valve 28A. In this way, once the hot water component HW is separated in the separator 18 and passed through the upper check valve 28B in a direction as indicated by arrow 27, the hot water component HW will flow towards the boiler 15 and not reenter the separator 18.

In using the steam generator system 10 of the present concept, calcium scale and other deposits may eventually form and decrease the overall performance of the system 10 if water high in mineral content, sometimes known as "hard" water, is used in the system 10. Optimally, deionized or distilled water will be used in the system 10 to reduce any deposits of this nature. However, if the user employs hard water in the steam generator system 10, there are several possibilities for descaling the system 10, which will now be described.

With further reference to FIG. 1, one possibility for descaling the steam generator system 10 includes one or more an in-line filters F1, F2 shown in supply line 22 and return line 34, respectively. When running a descaling cycle, pieces of scale (calcium) can flake off of the in-line heating element 14 and begin to flow through the system 10. These pieces of scale can be caught by the in-line filter F1 as the mixture M makes its way towards the separator 18. The scale will remain trapped in the in-line filter F1 and will not reenter the system 10. Similarly, in-line filter F2 can trap pieces of scale as the hot water component HW carries the pieces of scale in return line 34. In this way, the scale will be removed before the hot water component HW reaches the heating tube 16. Either filter F1 or F2 is contemplated to be sized so that the scale would be captured and held, possibly for the life of the cooking appliance in which the steam generator system is disposed. The filters F1, F2 may also be serviceable or replaceable components, such that they filters can be replaced or removed/cleaned if they become full of scale materials. Unlike other descaling options that expel a calcium/vinegar solution, discussed below with reference to FIGS. 2 and 3, the descaling option shown in FIG. 1 would boil off a vinegar solution and trap the free calcium in one of the filters F1, F2. It is contemplated that the steam generator system 10 may include one or both of the filters F1, F2 in assembly.

Referring now to FIG. 2, a steam generator system 10A is shown having similar components as found in steam generator system 10 of FIG. 1. Thus, the same reference numerals are used in FIGS. 1 and 2 to represent like parts. The steam generator system 10A of FIG. 2 includes a separate descaling system or descaling loop 40 having a descaling heater 42 disposed on the chain of supply lines shown in FIG. 2. Specifically, the descaling heater 42 is an in-line heater, much like in-line heating element 14 of FIG. 1, disposed on a supply line 44 that is in communication with a descaling tank 50 at a first end 44A, and further coupled in fluid communication with return line 34 at a second end 44B. In use, a descaling solution, which may include a calcium and vinegar solution CV, is introduced into the water reservoir 12 and allowed to circulate the system 10 for several minutes by activating the in-line heating element 14. After sufficient circulation, the descaling heater 42 may be activated and used to pump the calcium/vinegar solution CV upward in a direction as indicated by arrow 43 using a second bubble pump BP2 to a customer clean-out area identified as the descaling tank 50. The customer or user can then clean out the contents of the descaling tank 50 after the descaling cycle is run. It is contemplated that the second bubble pump BP2 operates in a manner similar to first bubble pump BP described above, using descaling heater 42 to heat the hot water component HW to power the pumping action of the second bubble pump BP2. It is further contemplated that the descaling tank 50 can be located and accessible from the cooking cavity 30 and can be a removable tank that is emptied by the user in a the user's sink.

Referring now to FIG. 3, a steam generator system 10B is shown having similar components as found in steam generator systems 10 and 10A of FIGS. 1 and 2, respectively. Thus, the same reference numerals are used in FIGS. 1, 2 and 3 to represent like parts. The steam generator system 10B of FIG. 3 includes a user-actuated valve 60 disposed in the return line 34 which is disposed downstream from the separator 18. The user-actuated valve 60 is operable between open and closed positions, wherein the system 10B (FIG. 3) operates in a manner similar to system 10 (FIG. 1) with the user-actuated valve 60 in the open position. The user-actuated valve 60 may be accessible by a user from the cooking cavity 30 for movement between open and closed positions. It is further contemplated that the user can actuate the user-actuated valve 60 from a user interface of the cooking appliance. The system 10B of FIG. 3 is configured such that a user can introduce a vinegar cleaning solution CS, or other like cleaning solution, into the water reservoir 12 and allow the solution CS to circulate in a manner similar to that described above with reference to FIG. 2. Then, the user-actuated valve 60, which may be a manual ball valve or electrical solenoid valve, in the return line 34 is closed off by user actuation to effectively close off the return line 34. Closing the user-actuated valve 60 chokes out the return line 34, thereby causing the cleaning solution CS to be expelled from the steam outlet 32 into the cooking cavity 30 where it can be collected and removed by the user. The expulsion of the cleaning solution CS through the steam outlet 32 is due to the fact that the separator 18 will no longer function to separate the hot water HW and steam S components into separate components with the return line 34 option unavailable due to the closing of the user-actuated valve 60. This is because there is only one path 25 for the cleaning solution CS to go when the user-actuated valve 60 is in the closed position. The available path 25 when the user-actuated valve 60 is in the closed position is directed towards the steam outlet 32 in the cooking cavity 30, from which the user can collect and discard the mineral deposits and other descaling elements removed from the system 10 during a descaling cycle.

Figure 4:
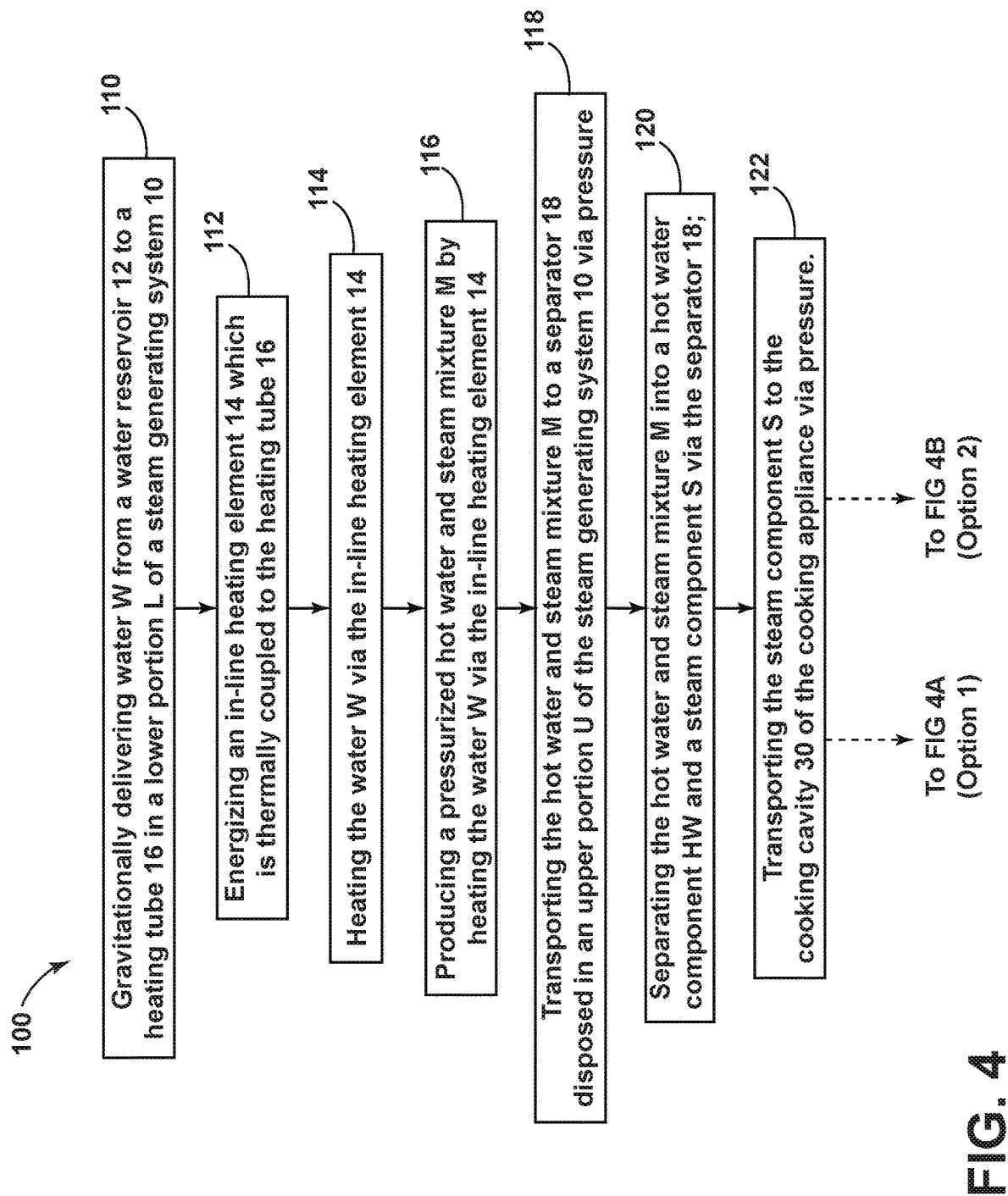
FIG. 4 is a flow chart representation of a steam generating method.
Figure 4A:
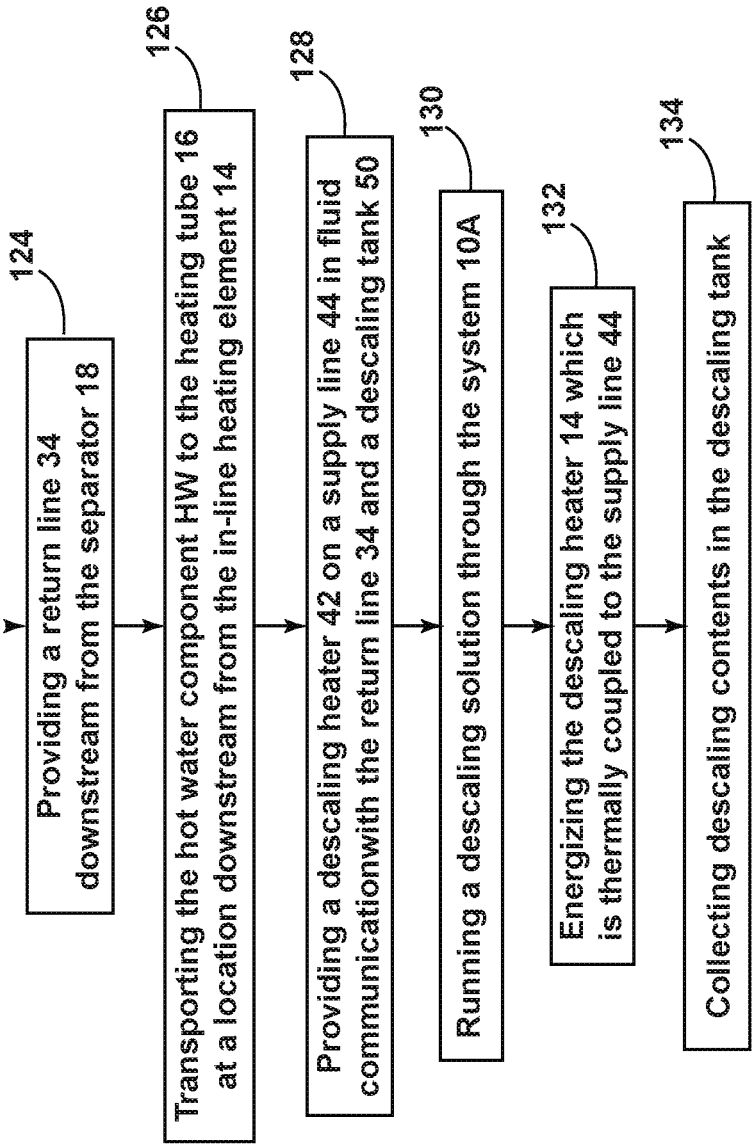
FIG. 4A is a flow chart representation of a descaling method for a steam generator system.
Figure 4B:
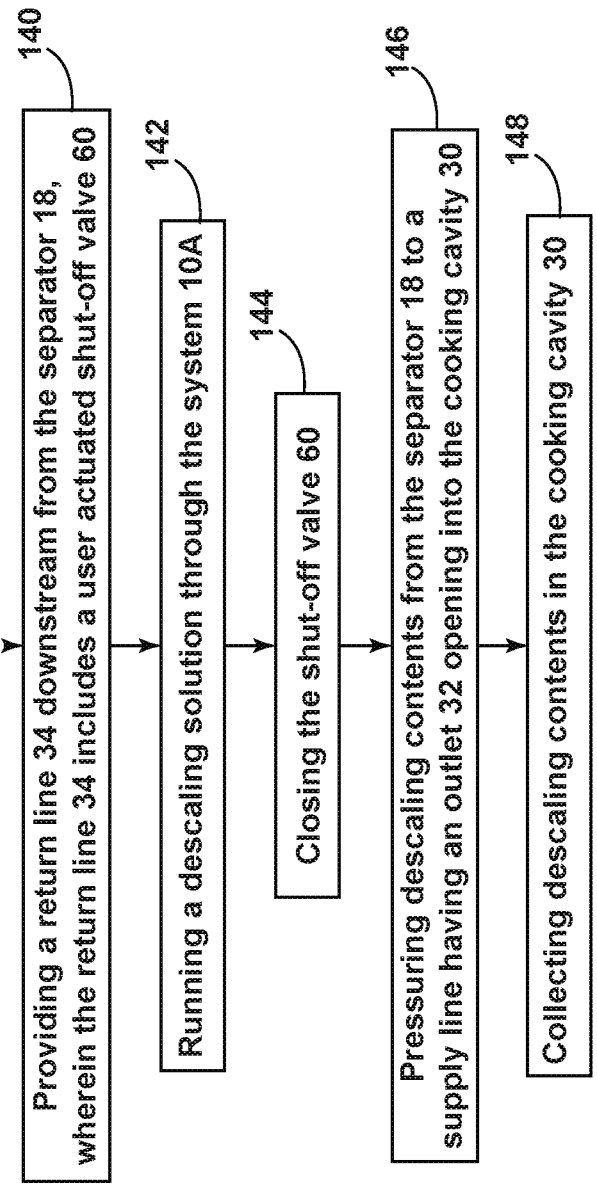
FIG. 4B is a flow chart representation of a descaling method for a steam generator system according to another embodiment.

The present concept further includes a method of generating and delivering steam S to a cooking cavity 30 of a cooking appliance using any one of the steam generating systems 10, 10A, or 10B described above. The method 100 is outlined in FIG. 4 and includes the following steps:

Step 110: gravitationally delivering water W from a water reservoir 12 to a heating tube 16 in a lower portion L of a steam generating system 10;

Step 112: energizing an in-line heating element 14 which is thermally coupled to the heating tube 16;

Step 114: heating the water W via the in-line heating element 14;

Step 116: producing a pressurized hot water and steam mixture M by heating the water W via the in-line heating element 14;

Step 118: transporting the hot water and steam mixture M to a separator 18 disposed in an upper portion U of the steam generating system 10 via pressure;

Step 120: separating the hot water and steam mixture M into a hot water component HW and a steam component S via the separator 18; and Step 122: transporting the steam component S to the cooking cavity 30 of the cooking appliance via pressure.

The method of generating and delivering steam 100 may further include the following steps:

Step 124: providing a return line 34 downstream from the separator 18;

Step 126: transporting the hot water component HW to the heating tube 16 at a location downstream from the in-line heating element 14;

Step 128: providing a descaling heater 42 on a supply line 44 in fluid communication with the return line 34 and a descaling tank 50;

Step 130: running a descaling solution through the system 10A;

Step 132: energizing the descaling heater 14 which is thermally coupled to the supply line 44;

Step 134: collecting descaling contents in the descaling tank.

Another method 200 of generating and delivering steam may further include the following steps:

Step 140: providing a return line 34 downstream from the separator 18, wherein the return line 34 includes a user actuated shut-off valve 60;

Step 142: running a descaling solution through the system 10A;

Step 144: closing the user actuated shut-off valve 60;

Step 146: pressuring descaling contents from the separator 18 to a supply line having an outlet 32 opening into the cooking cavity 30; and Step 148: collecting descaling contents in the cooking cavity 30.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical, magnetic, thermal or mechanical) directly or indirectly to one another. Such joining may be stationary in nature or movable in nature. Such joining may be achieved with the two components (electrical, magnetic or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

The invention claimed is:

1. A steam generator system for a cooking appliance having a cooking cavity, the steam generator system comprising:
    an upper portion;
    a lower portion disposed below the upper portion;
    a water reservoir configured to store water, wherein a water line of stored water in the water reservoir defines a boundary between the upper portion and lower portion;
    a heating tube disposed in the lower portion and operably coupled to the water reservoir, wherein water from the water reservoir is gravitationally fed into the heating tube;
    an in-line heating element disposed in the lower portion along the heating tube for heating water in the heating tube to produce a hot water and steam mixture;
    a first supply line coupled to the in-line heating element in the lower portion at a first end of the first supply line and having a second end disposed in the upper portion, wherein the hot water and steam mixture is moved under pressure up the first supply line from the lower portion to the upper portion;
    a separator disposed in the upper portion and operably coupled to the second end of the first supply line, wherein the separator is configured to separate a steam component and a hot water component from the steam and hot water mixture;
    a second supply line coupled to the separator at a first end and opening into the cooking cavity at a second end, wherein the second end of the second supply line is disposed vertically above the first end of the second supply line, such that the steam component separated at the separator moves at least partially vertically along the second supply line to the cooking cavity; and a return line coupled to the separator at a first end disposed within the upper portion and further coupled to the heating tube at a second end disposed within in the lower portion.

2. The steam generator system of claim 1, including:
a first filter element disposed between the first and second ends of the first supply line.

3. The steam generator system of claim 2, including:
a second filter element disposed between the first and second ends of the return line.

4. The steam generator system of claim 3, wherein the first filter element is disposed in the upper portion of the system, and further wherein the second filter element is disposed in the lower portion of the system.

5. The steam generator system of claim 1, including:
a lower check valve disposed between the water reservoir and the in-line heating element in the lower portion of the system.

6. The steam generator system of claim 5, including:
an upper check valve disposed in the return line between the separator and the in-line heating element in the upper portion of the system.

7. The steam generator system of claim 1, wherein the steam component is delivered to the cooking cavity via a steam outlet disposed in the cooking cavity.

8. The steam generator system of claim 1, wherein the return line is configured to gravitationally deliver the hot water component separated by the separator to the heating tube at a location on the heating tube downstream from the in-line heating element.

9. A steam generator system for a cooking appliance having a cooking cavity, the steam generator system comprising:
a water reservoir at least partially disposed in both an upper and a lower portion of the steam generator system;
a first in-line heating element disposed in the lower portion of the steam generator system;
a heating tube interconnecting the water reservoir with the first in-line heating element, wherein the water from the water reservoir is gravitationally fed to the heating tube for heating by the first in-line heating element to produce a hot water and steam mixture;
a first supply line having first and second ends, the first supply line coupled to the heating tube at the first end thereof in the lower portion of the steam generator system;
a separator disposed in the upper portion of the steam generator system, wherein the second end of the first supply line is operably coupled to the separator in the upper portion of the steam generator system, wherein the hot water and steam mixture defines a first bubble pump to move the hot water and steam mixture from the lower portion of the steam generator system to the separator in the upper portion of the steam generator system along the first supply line;
a second supply line disposed in the upper portion of the steam generator system and coupled to the separator at a first end and further including a steam outlet opening into the cooking cavity at a second end, wherein the second supply line is configured to supply steam separated at the separator to the cooking cavity;
a return line disposed partially in both the upper and lower portions of the steam generator system, wherein the return line is operably coupled to the separator at a first end in the upper portion of the steam generator system, and further wherein the return line is operably coupled to the heating tube in the lower portion of the steam generator system at a second end thereof;
a second in-line heating element operably coupled to the return line between the first and second ends of the return line; and
a third supply line interconnecting the second in-line heating element with a descaling tank.

10. The steam generator system of claim 9, including:
a lower check valve disposed between the water reservoir and the first in-line heating element in the lower portion of the steam generator system.

11. The steam generator system of claim 10, including:
an upper check valve disposed along the return line between the separator and the second in-line heating element in the upper portion of the steam generator system.

12. The steam generator system of claim 9, wherein the third supply line is disposed partially in both the upper and lower portions of the steam generator system, wherein the third supply line is operably coupled to the second in-line heating element at a first end in the lower portion of the steam generator system, and further wherein the third supply line is operably coupled to the descaling tank in the upper portion of the steam generator system at a second end thereof.

13. The steam generator system of claim 9, including:
a first filter element disposed between the first and second ends of the first supply line.

14. The steam generator system of claim 13, including:
a second filter element disposed between the first and second ends of the return line.

15. A method of generating and delivering steam to a cooking cavity of a cooking appliance, the method comprising the steps of:
gravitationally delivering water from a water reservoir to a heating tube disposed in a lower portion of a system;
energizing an in-line heating element thermally coupled to the heating tube;
heating the water in the heating tube via the in-line heating element to produce a pressurized hot water and steam mixture;
transporting the hot water and steam mixture along a first supply line to a first filter element disposed along the first supply line in an upper portion of the system, wherein the first supply line is partially disposed in both the upper and lower portions of the system;
filtering the hot water and steam mixture using the first filter element;
transporting the hot water and steam mixture to a separator disposed in the upper portion of the system through the first supply line;
separating the hot water and steam mixture into a hot water component and a steam component via the separator;
transporting the steam component to the cooking cavity of the cooking appliance via a second supply line disposed in the upper portion of the system;
delivering the hot water component to a return line, wherein the return line is partially disposed in both the upper and lower portions of the system; and
reintroducing the hot water component to the heating tube from the return line in the lower portion of the system.

16. The method of claim 15, wherein the step of reintroducing the hot water component to the heating tube further includes reintroducing the hot water component to the heating tube from the return line at a location on the heating tube positioned downstream from the in-line heating element.

17. The method of claim 15, wherein the step of gravitationally delivering water from a water reservoir to a heating tube in a lower portion of a system further includes passing the water through a one-way check valve disposed in the lower portion of the system.

18. The method of claim 17, wherein the step of delivering the hot water component to a return line further includes passing the hot water component through a one-way check valve disposed in an upper portion of the system.

19. The method of claim 15, wherein the step of delivering the hot water component to a return line further includes passing the hot water component through a second filter element disposed within the return line.

20. The method of claim 19, including:
   filtering the hot water using the second filter element within the return line before reintroducing the hot water component to the heating tube.

\* \* \* \* \*